April 21, 1964 R. M. WILSON 3,129,883

REGISTER RESETTING MECHANISM

Filed April 9, 1962 2 Sheets-Sheet 1

INVENTOR.
Ronald M. Wilson,
BY
Paul & Paul
ATTORNEYS.

INVENTOR.
Ronald M. Wilson,
BY
Paul & Paul
ATTORNEYS.

3,129,883

REGISTER RESETTING MECHANISM

Ronald M. Wilson, Ambler, Pa., assignor to William M. Wilson's Sons, Inc., Lansdale, Pa., a corporation of Pennsylvania Filed Apr. 9, 1962, Ser. No. 186,151
14 Claims. (Cl. 235—144)

This invention relates to a register resetting mechanism and, in particular, to a mechanism which allows a register to be returned positively and quickly to a zero position without moving beyond the zero position and, at the same time, be quickly and positively reset for counting.

The prior art discloses a variety of mechanisms and means for resetting counters and register devices to the count starting point. One prior art patent which discloses a mechanism for accomplishing the above object is U.S. Patent No. 2,930,528, which was issued to Elmer A. Robbins on March 29, 1960. The mechanism disclosed therein comprises a three plate structure with a spring movable along a fixed cam surface formed in a central plate. Rotational movement of the spring is accomplished by means of a rotor attached to a central resetting shaft. Experience has shown that devices based on rotating springs, as in the case of Robbins, are subject to operative and manufacturing difficulties. Some of the other disadvantages of the prior art devices are that they provide no positive stopping means to prevent the rotation of the reset shaft beyond the zero position. In addition, many of these devices do not provide for quick and easy manipulation of the reset mechanism to place the register in position for subsequent resetting. The present invention provides positive stopping and quick resetting for counters using biasing means anchored to structure and avoiding any rotation of spring structure. The compact construction of applicant's resetting mechanism ensures that it will function under conditions of rough handling as part of a relatively small register, that the parts can be inexpensively fabricated and assembled, and that return to the zero condition preparatory to subsequent counts is achieved under the quick, positive control of the operator.

Therefore, it is an object of this invention to provide an improved resetting mechanism which is positive in action while requiring fewer moving parts and possesses greater efficiency in operation than disclosed in the mechanisms of the prior art.

It is another object of this invention to provide a resetting mechanism which is compact and rugged in construction, simple to assemble and operate, and of such design that the mechanism will return the register dials to the count starting point and no further.

It is a further object of this invention to provide a resetting mechanism having a positive zero stop which will not only prevent reset beyond zero but which may be released for subsequent resets simply by a slight backward motion of the reset shaft.

These and other objects of my invention will become more apparent from this description and from the drawings attached hereto in which.

Figures 1, 2, 3, 4, 5, 6, 7, 8, 9, 10, 11:
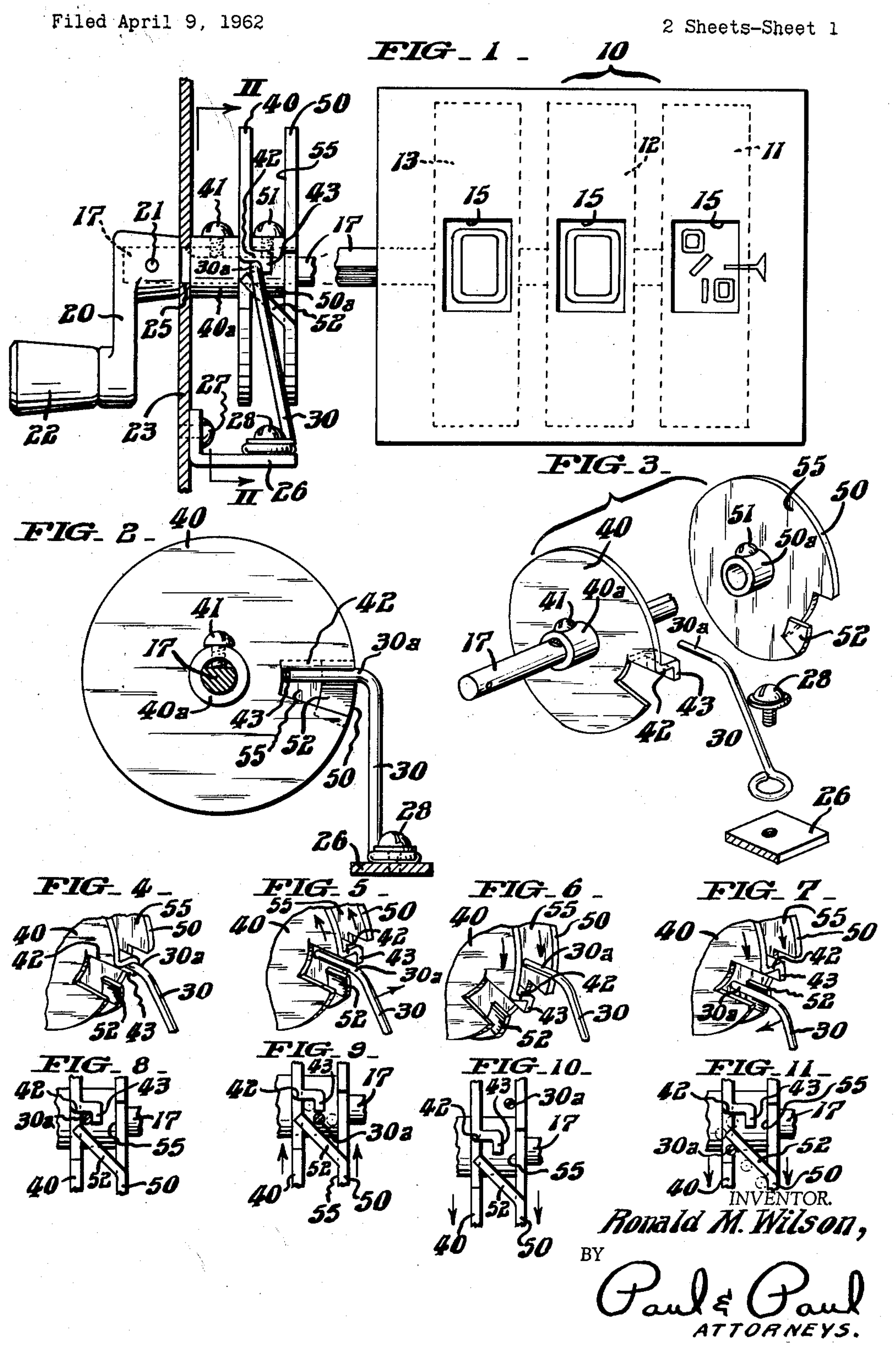
FIG. 1 is a side elevational view partly cut away, showing one form of the resetting mechanism of this invention.
FIG. 2 is a front elevational view taken along the lines and arrows II—II of FIG. 1.
FIG. 3 is an exploded perspective view showing the parts of the resetting mechanism shown in FIGS. 1 and 2.
FIGS. 4–11 are perspective and side elevational views, partly cut away, illustrating the relative positions of the bar and the disks of the form of the invention shown in FIGS. 1 to 3, as said parts rotate during a typical cycle of operation.

One form of reset limit mechanism of this invention is shown in the left hand of FIG. 1 where it is shown separated by the break in shaft 17 from the remaining parts of a commonly known register or counter. The register, designated generally by the numeral 10 and simply set out in FIG. 1, includes three dials 11–13, partly exposed, which are geared together by means well known in the art so that when the first dial 11, which is connected directly with the measuring means by a flexible cable or the like, completes one revolution it will cause the second dial 12 to rotate a predetermined portion of one revolution. The second dial 12 correspondingly advances the third dial 13 when the second dial 12 has completed one revolution. In the face of the register there are three windows 15 through which are displayed the numerals located on the rotating dials 11–13. All three dials may be attached to a counter shaft 17 in a variety of ways. Under all circumstances, means is provided whereby the rotation of the shaft 17 in the resetting direction will engage pawls or the like attached to the dials so that the dials are returned, all at the same time, to the initial starting position when the shaft 17 is turned to the starting position. The prior art clearly shows a variety of means for accomplishing the picking up of each dial when the shaft is rotated in the resetting direction and therefore the details of this mechanism have been merely incorporated by reference.

One form of the resetting mechanism of this invention consists of the combination of elements shown generally on the left side of FIG. 1 and consists, in particular, of a handle 20 fixedly attached to a reset shaft 17 by a pin 21 which extends through the handle into the shaft 17. The handle 20 is equipped with a freely rotating attachment 22 which facilitates the manual rotation of the handle. Adjacent the handle 20, as shown in FIG. 1, is a partition 23 which may be one wall of the outside cover of the counter or register and serves to support the handle end of the shaft 17. It should be understood that the shaft 17 rotates freely within a bore 25 in partition 23. Attached to a lower part of partition 23, as shown in FIG. 1, is an L-shaped bracket 26 held to the partition by a screw 27. Attached to the bracket by a screw 28 is a flexible limit bar 30 preferably composed of metal having a high tensile strength, such as steel. The end 30_a_ of the bar 30 is turned at an angle to the upright leg of the bar.

Attached to the shaft 17 are two circular disks 40 and 50, preferably composed of metal. Disk 40 is held fixedly attached to the shaft 17 by a screw 41 which engages the disk collar 40_a_ and bears on shaft 17. Disk 50 is likewise fixedly held to the shaft 17 by means of a screw 51 which engages the disk collar 50_a_ and bears on shaft 17. The end 30_a_ of bar 30 is positioned in the space between the disks 40 and 50.

Referring now to FIGS. 2 and 3 of the drawings, both disks 40 and 50 are seen to have an angularly displaced peripheral portion which extends away from the plane of the disks. Directing attention first to disk 50, the displaced portion 52 is seen to be directed away from disk 50 toward disk 40 at an acute angle. The displaced portion 42 of disk 40 is directed at substantially a right angle from disk 40 toward disk 50 and has, at its distal end, a downwardly extending lip 43. This lip acts as a restraining means to hold the limit bar 30_a_ and forms substantially a second right angle between the straight beginning of the displaced portion 42 and the plane of lip 43, which plane is substantially parallel to the plane of disk 40.

Both disks are arranged on shaft 17 so that their displaced portions are directed toward each other and arranged so that the end of portion 52 is located in the space vacated by the displaced portion 42. The space between portion 52 and portion 42 at the closest point is relatively small but is sufficient to unobstructed passage of the bar end 30a on rotation of the disks.

In operation, this form of reset limit mechanism of my invention functions substantially as follows:

As shown in FIGS. 4 and 8, FIG. 4 being a perspective view and FIG. 8 being a side elevational view, the bar end 30a is positioned against portion 42 and lip 43 in the zero setting. It should be understood that the disk 40 is positioned on the circumference of shaft 17 so that when the bar end 30a is against portion 42, thus preventing further clockwise rotation of the disks, i.e., the zero position of the shaft and disks, the dials 11–13 are also in their zero setting as shown in FIG. 1. It should be further understood that the portion 42 extending at right angles to disk 40 and substantially parallel to the axis of shaft 17, provides an absolute stop against which the bar end acts to prevent further clockwise rotation of the shaft and the disks. As shown in FIGS. 5 and 9, to prepare the mechanism for resetting, the resetting device, and in particular disk 40, is backed off in the direction of the arrows so as to allow bar end 30a to escape from lip 43 and spring to the right proximate disk 50 as shown representatively in FIG. 9. This action is obtained by mounting the bar 30 closer to disk 50 than to disk 40 thus biasing the bar 30 toward surface 55 of disk 50. However, other biasing means could be used. As disclosed supra, shaft 17 is connected to the dials 11–13 in such a way that counting will be accomplished without the rotation of the shaft. When it is desired to reset the register to the zero or starting point, handle 20 is rotated clockwise causing the shaft and both disks 40 and 50 to rotate in the same direction, whereby the two disks rotate clear of the bar end 30a until portion 52 of disk 50 comes into contact with the bar end 30a as shown in FIG. 11. As the disks are further rotated, the bar 30 is displaced laterally toward the opening in disk 40 until the bar end 30a passes around the end of portion 52, at which time it springs inwardly against portion 42 and lip 43 thereby preventing further clockwise rotation of shaft 17. From this position the mechanism may be cleared for subsequent resets by a small counterclockwise rotation of the disks 40 and 50 by means of handle 20.

It should be understood from the disclosure herein that the mechanism of this invention provides a positive zero stopping means which may be overcome by a slight turn of the shaft in the counterclockwise or non-reset direction. The movement of the shaft in the counterclockwise direction ensures that pawls (not shown) on all number wheels or dials will be picked up by shaft 17 and all dials will be returned to the zero position.

It will also be seen that this form of the resetting mechanism as shown, consists of uncomplicated parts which can be easily fabricated by well known metal stamping techniques or by similar methods. It should also be appreciated that this invention involves the rotation of only two disks and that the fixed location of the limit bar is positioned to guarantee successful operation of the mechanism in each operation.

Figure 12:
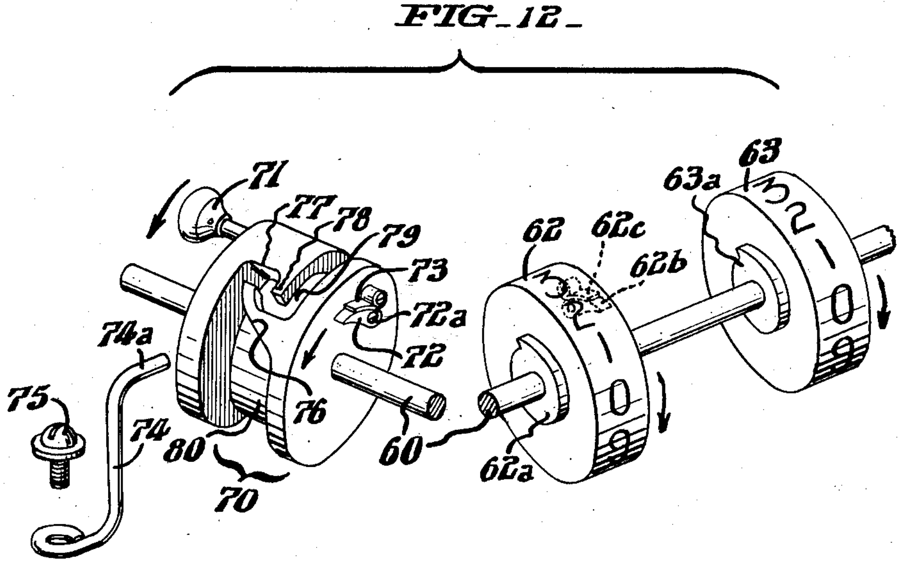
FIG. 12 is an exploded perspective view of one modification of the reset limit mechanism of my invention.
Figure 13:
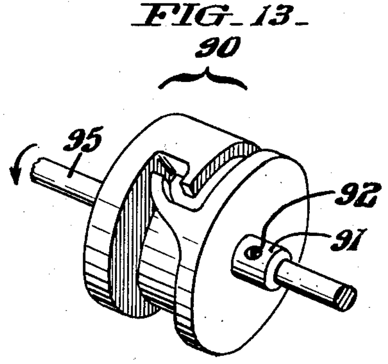
FIG. 13 is a perspective view of a second modification of the reset limit mechanism of my invention.

Two modified forms of this invention are shown in FIGS. 12 and 13. The modification of FIG. 12 consists of a stationary mounted shaft 60 upon which the resetting limit mechanism 70 rotates freely. Two wheels or counting elements 62, 63 are similarly mounted for free rotation on shaft 60. The resetting limit mechanism 70 and the wheels 62, 63 are positioned continuous to each other so that upon the rotation of handle 71 attached to mechanism 70 in the direction indicated by the arrow, the pawl 72, attached by a screw 72a to mechanism 70, will engage a ratchet 62a attached to wheel 62 and cause wheel 62 to rotate in the same direction as mechanism 70. Similarly, wheel 62 is equipped with a pawl 62b, shown in broken lines, which engages a ratchet 63a attached to wheel 63 and thus rotates wheel 63 when wheel 62 is turned in the resetting direction as indicated by the arrow. Springs 73, 62c hold pawls 72, 62b against ratchets 62a, 63a, respectively, allowing the pawls to slide around the ratchets when the counting wheels 62, 63 are counting or rotating in a direction opposite to that of the arrow.

The resetting limit mechanism 70 of the modification shown in FIG. 12 is similar in operation to that of the structure shown in FIG. 1, however the mechanism of FIG. 12 is of unitary construction, except for the separate limit means or flexible bar 74. Bar 74 is fixedly mounted on a support (not shown) by a screw 75 and the end portion 74a is positioned for operative engagement within tapering groove 80 as the mechanism 70 rotates. Similar to the mechanism shown in FIG. 1, the projecting flange 76 forms a cam against which the bar 74 flexes in a direction which is substantially transverse to the direction of rotation of the resetting mechanism 70 and substantially parallel to the axis of shaft 60. As the mechanism 70 rotates in the direction of the arrow, bar end 74a, biased toward the right side of mechanism 70 as shown in FIG. 12, slides along flange 76 until it passes around the end of flange 76 and up against the stop 77 which is a portion of the solid body of mechanism 70. The flexible bar 74 then springs to the right against the projecting lip or receptacle 78, at which point the bar remains until mechanism 70, by means of handle 71, is rotated a short distance in the direction opposite to that of the arrows whereby the bar 74 passes around lip 78 and through channel 79 and into groove 80. The principle of operation of this modification is the same as that of the reset limit mechanism shown in FIG. 1, however, the mechanism shown in FIG. 12 provides a unitary construction instead of two disks.

The operation of the modification shown in FIG. 12 is as follows:

When it is desired to reset the counting wheels 62, 63, of which there may be any number to the zero position, the handle 71 is rotated in the direction of the arrow causing the reset limit mechanism 70 to rotate in the same direction around shaft 60. The pawls 72, 62b engage ratchets 62a, 63a, respectively, and cause the wheels 62, 63 to rotate in the same direction. The stationary limit bar end 74a remains in the groove 80 of the rotating mechanism 70 until the bar is deflected slightly laterally along flange 76 and against the stop 77, the mechanism 70 cannot rotate further in the resetting direction and, correspondingly, the counting wheels 62, 63 are not driven beyond this point and do not pass beyond the zero position. Bar end 74a springs against lip 78 when it is free of flange 76 and is held thereby until the mechanism 70 is rotated in the opposite or counting direction. When the wheels are counting, they rotate freely around shaft 60 and freely from mechanism 70 driven by counting mechanism not shown. When resetting is once again desired, the mechanism 70 is immediately ready for reset by rotating the mechanism a short distance in the anti-count direction to free bar 74 from lip 78 and then rotating the reset limit mechanism 70 again in the resetting direction.

Another modification of my invention is shown in FIG. 13. There, the reset limiting mechanism 90 is similar in construction to that shown in FIG. 12 with the difference that the mechanism 90 is attached to the manually driven, rotating shaft 95 by a collar 91, which is part of mechanism 90, and a shaft gripping screw 92. In this modification, the shaft is rotated by a handle (not shown) as in FIG. 1 and the mechanism performs a function which duplicates that of the two disks 40 and 50 shown in FIG. 1. It should be clear from the drawing and description that the reset limit mechanism of FIG. 13 and that of FIG. 1 are similar in that both are fixedly mounted to a rotating, manually driven shaft and that the shaft has means attached thereto whereby the counting elements or wheels are engaged and rotated in the resetting direction. In contrast to these forms of my invention, FIG. 12 shows a reset limit mechanism which rotates freely around a stationary shaft, said mechanism itself driven by a crank and said mechanism having ratchet and pawl means for engaging and rotating the first counting element in the reset direction and thereby driving all the counting elements.

While a preferred embodiment of my invention is shown in the drawings and described supra, it is obvious that various changes may be made in the form, structure, and arrangement of parts without departing from the spirit of the invention. For instance, it may be found advantageous to locate the laterally directing portion and the rotating stop in different relative positions, or that the limit bar assume a different shape, but such changes would be mere alterations of the particular means shown and well within the inventive concept as disclosed in the specification and the scope of the appended claims.

I claim:

1. In a resettable register having count indicating elements, means for returning the count indicating elements to the zero position comprising a shaft supporting a plurality of count indication elements, a first and second disk fixedly attached to the shaft and mounted proximate to each other with a space between, each disk having a peripheral portion angularly displaced in the direction of the other disk, said peripheral portions forming a passageway therebetween; and a bar fixedly mounted adjacent the shaft having one end positioned in the space between said disks, the end of the bar being axially displaced by a peripheral portion of one disk and adapted to enter the passageway between the displaced peripheral portions on rotation of said disks.

2. The register as defined in claim 1 wherein means is provided to rotate the shaft so that the counting dials are returned to the zero position.

3. In a resettable register having count indicating elements, means for returning the count indicating elements to the zero position comprising a shaft supporting a plurality of count indicating elements, means for rotating said shaft, two disks fixedly mounted on the shaft proximate to each other with a space between, the first disk having a peripheral portion angularly displaced in the direction of the second disk, the second disk having a peripheral portion displaced at substantially a right angle to the plane of the disk in the direction of the first disk, said peripheral portions forming a passageway therebetween; and a fixedly mounted bar positioned in the space between said disks, the end of the bar being adapted to enter the passageway between the displaced peripheral portions on rotation of said disks.

4. In a resettable register having count indicating elements, means for returning the count indicating elements to the zero position comprising a shaft supporting a plurality of counting indicating elements, uni-directional latch means connecting said elements to the shaft whereby upon rotation of the shaft in the resetting direction all of the elements will be rotated, means for rotating said shaft, two disks fixedly attached to the shaft proximate to each other with a space between, the first disk having a peripheral portion angularly displaced in the direction of the second disk, the second disk having a peripheral portion displaced at substantially a right angle to the plane of the disk in the direction of the first disk, said peripheral portion having a lip at the end thereof, the end of the displaced peripheral portion of the first disk positioned within the space vacated by the displaced peripheral portion of the second disk, said peripheral portions forming a passageway therebetween; and a fixedly mounted bar positioned in the space between said disks, the end of the bar being adapted to enter the passageway between the displaced peripheral portions on rotation of said disks and to be retained by the lip of the displaced peripheral portion of the second disk thereby preventing further rotation of said disks.

5. In a resettable register having count indicating elements, means for returning the count indicating elements to a zero position comprising a shaft supporting a resetting limit means and a plurality of count indicating elements, means operatively connecting the resetting limit means and the count indicating elements whereby said elements are rotated in the resetting direction to a zero position as the resetting limit means is rotated the resetting limit means comprising a substantially cylindrically shaped body having an annular groove exending around said body on the curved surface thereof, a portion of said body forming a flange extending into said groove at one point, another portion of said body forming a stop, said flange and stop positioned to form a passageway therebetween, means for rotating said resetting limit means and a fixedly mounted limit bar positioned for operative engagement within said groove whereby on rotation of the resetting limit means said limit bar is displaced by said flange against said stop to prevent the further rotation of the resetting limit means.

6. In a resettable register having count indicating elements, means for returning the count indicating elements to the zero position comprising a shaft supporting a resetting limit means and a plurality of count indicating elements, means operatively connecting the resetting limit means and the count indicating elements whereby said elements are rotated in the resetting direction to a zero position as the resetting limit means is rotated, the resetting limit means comprising a substantially cylindrically shaped body having an annular groove extending around said body on the curved surface thereof; a portion of said body forming a flange extending into said annular groove at one point, a second portion of said body forming a stop extending into said groove at a point adjacent to said flange, said flange and stop forming a passageway therebetween, a limit bar holding means positioned adjacent to said stop, means for rotating said resetting limit means, and a fixedly mounted limit bar positioned for operative engagement within said groove and biased in a direction against said flange whereby upon rotation of the resetting limit means in the resetting direction said bar is displaced by said flange against said bias into said stop and limit bar holding means thereby preventing the further rotation of the resetting limit means, said limit bar being removed from the holding means by a rotation of the resetting limit means in the opposite direction.

7. The register as defined in claim 6 wherein the means operatively connecting the resetting limit means and the count indicating elements comprises a pawl and ratchet means attached to the resetting limit means and the adjacent count indicating element and attached to each adjacent count indicating elements.

8. In a resettable register having count indicating elements, means for returning the count indicating elements to a zero position comprising a shaft supporting a resetting limit means and a plurality of count indicating elements, means connecting the resetting limit means to the shaft, said resetting limit means comprising a substantially cylindrically shaped body having an annular groove extending around said body on the curved surface thereof, a portion of said body forming a flange extending into said annular groove at one point, a second portion of said body forming a stop extending into said groove at a point adjacent to said flange, said flange and stop forming a passageway therebetween, means for rotating said resetting limit means and a fixedly mounted limit bar positioned for operative engagements within said groove whereby upon rotation of the resetting limit means said limit bar is displaced by said flange against said stop to prevent the further rotation of the resetting limit means.

9. The register as defined in claim 8 wherein is provided means connecting the count indicating elements to the shaft whereby upon rotation of the shaft in the resetting direction all of the counting elements will be rotated to a zero position.

10. The register as defined in claim 9 wherein is provided limit bar holding means, said means being positioned adjacent to said stop whereby said holding means holds the limit bar proximate said stop until the resettting limit means is rotated in the direction whereby said limit bar is displaced from the holding means and passes through the passageway.

11. In a resettable register having count indicating elements, means for returning the count indicating elements to a zero position comprising a shaft supporting a plurality of count indicating elements, resetting limit means mounted on the shaft for rotation, means connecting the resetting limit means and the count indicating elements for rotating said elements in the resetting direction when the resetting limit means is rotated, said resetting limit means including means forming a channel extending transverse to the shaft, an inclined substantially axially directing displacing means extending into said channel from one side thereof and a stop positioned proximate said displacing means and extending into said channel from the side opposite to that of the displacing means, means for rotating said resetting limit means, and limit means being stationarily mounted independent of said resetting limit means, said independent limit means having a portion thereof positioned within said channel free from contact with the resetting limit means whereby said portion remains within the channel as the resetting limit means is rotated until said portion is displaced axially by the displacing means against said stop thereby preventing further rotation of the resetting limit means.

12. The resettable register as defined in claim 11 wherein the independent limit means comprises a flexible member mounted on a stationary support adjacent said resetting limit means, said member being biased toward the side of the channel opposite to the side adjacent the stop, said flexible member having an extending portion thereof positioned within the channel of said resetting limit means.

13. The resettable register as defined in claim 12 wherein the resetting limit means is provided with holding means for retaining the flexible member against the stop, said holding means being mounted contiguous said stop and so shaped that the flexible member is continuously held by the holding means against said stop upon rotation of the resetting limit means in the resetting direction and the flexible member being removed from the holding means by rotation of the resetting limit means in the opposite direction.

14. The resettable register as defined in claim 13 wherein the displacing means comprises a cam extending axially into said channel from one side thereof forming a first passageway between the termination of said cam and the opposing side of the channel, said stop comprising a projecting member extending from the opposing side of the channel into said first passageway and forming a second passageway between the cam and the projecting member, and said holding means comprising a stud mounted on the projecting member, said stud extending into the second passageway whereby upon rotation of the resetting limit means in the resetting direction, the flexible member is displaced axially against said bias by said cam until said flexible member passes through said first passageway and against said projecting member, said flexible member thereupon moving axially in the direction of the bias through the second passageway until contacting said stud whereupon further axial movement of the flexible member toward said bias is limited.

References Cited in the file of this patent

UNITED STATES PATENTS

| | | |
|---|---|---|
| 2,020,225 | Aamot et al. | Nov. 5, 1935 |
| 2,272,417 | Marvel | Feb. 10, 1942 |
| 2,846,145 | Van Veen | Aug. 5, 1958 |
| 2,885,147 | Dunning | May 5, 1959 |
| 2,930,528 | Robbins | Mar. 29, 1960 |
| 3,008,608 | Wilson | Nov. 14, 1961 |